FIG.1A

Oct. 11, 1960 A. K. HAMMELL 2,955,781
AUTOMATIC PILOT
Filed Dec. 12, 1955 5 Sheets-Sheet 2

INVENTOR.
ALLAN K. HAMMELL
BY Gordon Reed
ATTORNEY

INVENTOR.
ALLAN K. HAMMELL

United States Patent Office 2,955,781
Patented Oct. 11, 1960

2,955,781
AUTOMATIC PILOT

Allan K. Hammell, Minneapolis, Minn., assignor to Minneapolis-Honeywell Regulator Company, Minneapolis, Minn., a corporation of Delaware Filed Dec. 12, 1955, Ser. No. 552,333

16 Claims. (Cl. 244—76)

This invention relates to condition control apparatus such as automatic pilots for aircraft. More particularly the invention pertains to a novel yaw axis control system for an aircraft automatic pilot. While as contemplated such yaw axis control system may function as a yaw damper independently of other control channels in the aircraft automatic pilot which provide pitch attitude or bank attitude control, the yaw axis control apparatus will also position means to control craft yaw in consequence of the operation of the bank attitude control channel. It thus functions by means of rate responsive devices such as rate gyroscopes not only as a yaw damper but also as a bank turn coordinator for an aircraft.

In the novel embodiment provided, the yaw damper apparatus is a closed loop servo system that effectively damps out yaw oscillations of an aircraft and coordinates the operation of the yaw control means for the craft during entries and recoveries from banked turns.

In this particular application of the invention the damper system controls a hydraulic servomotor to position or displace the rudder surface. However this surface may have its position manually controlled independently of the damper apparatus.

Under manual control, the rate of flow through the servomotor control valve is nonlinear with respect to the displacement from normal position of a manual controllor. In other words, the volume of fluid passing through the control valve port does not vary directly with the displacement of the valve. Since the damper system automatically positions the same control valve, a feature of the invention is in providing means to improve the dynamic characteristics of the hydraulic servo motor while under damper control thereof so that its rate of displacement in magnitude is approximately linearly proportional to the damper apparatus control signal.

The damper system as stated utilizes a rate gryroscope to assist in damping the craft oscillation, and since it may be necessary to vary the gain of the gyroscope for various types of aircraft a novel gain control for the gyroscope is a further feature of the invention.

In the turn coordinating and yaw damper system for an aircraft of the present invention, a yaw responsive rate gyroscope through an electrical network provides the primary yaw and dutch roll stabilization signal. Through the use of a high pass filter, the yaw rate signal is effectively high passed to attenuate the constant output of the yaw rate gyroscope in a steady coordinated banked turn. By deriving a roll rate signal from a gyroscope and applying it to a network a lagged roll rate signal is obtained which provides an effect for the contribution to dynamic coordination in banked turns sometimes alternatively obtained from a craft bank angle signal derived from a vertical gyroscope that senses bank attitude. The combination of high passed yaw rates and lagged roll rates during banked turns is summed with roll rate in conventional aircraft, and with aileron displacement to provide further dynamic coordination. The roll rate signal, unlagged, compensates for the adverse yawing movement resulting from the craft roll rate. The aileron position or displacement signal into the network of the damper system compensates for the adverse but sometimes favorable yawing movements resulting from the deflection of the ailerons in the wings of the aircraft. For some of the flight conditions of the craft, the airplane or aircraft has an appreciable cross product of inertia so that the roll rate and aileron position signals in the network must also minimize the yawing movements due to roll acceleration. The resultant control in the network contains elements of high passed yaw rate, lagged roll rate, roll rate, and aileron position which are further combined with damper servomotor displacement. The entire combination is supplied through an amplifier to a yaw damper servo motor. The servo motor in turn controls the power means for actuating the rudder surface. The power means alternatively may be controlled manually.

The invention will be more fully understood by referring now to the following detailed description and accompanying drawings of an improved yaw axis control system embodying my invention.

Figure 1A:
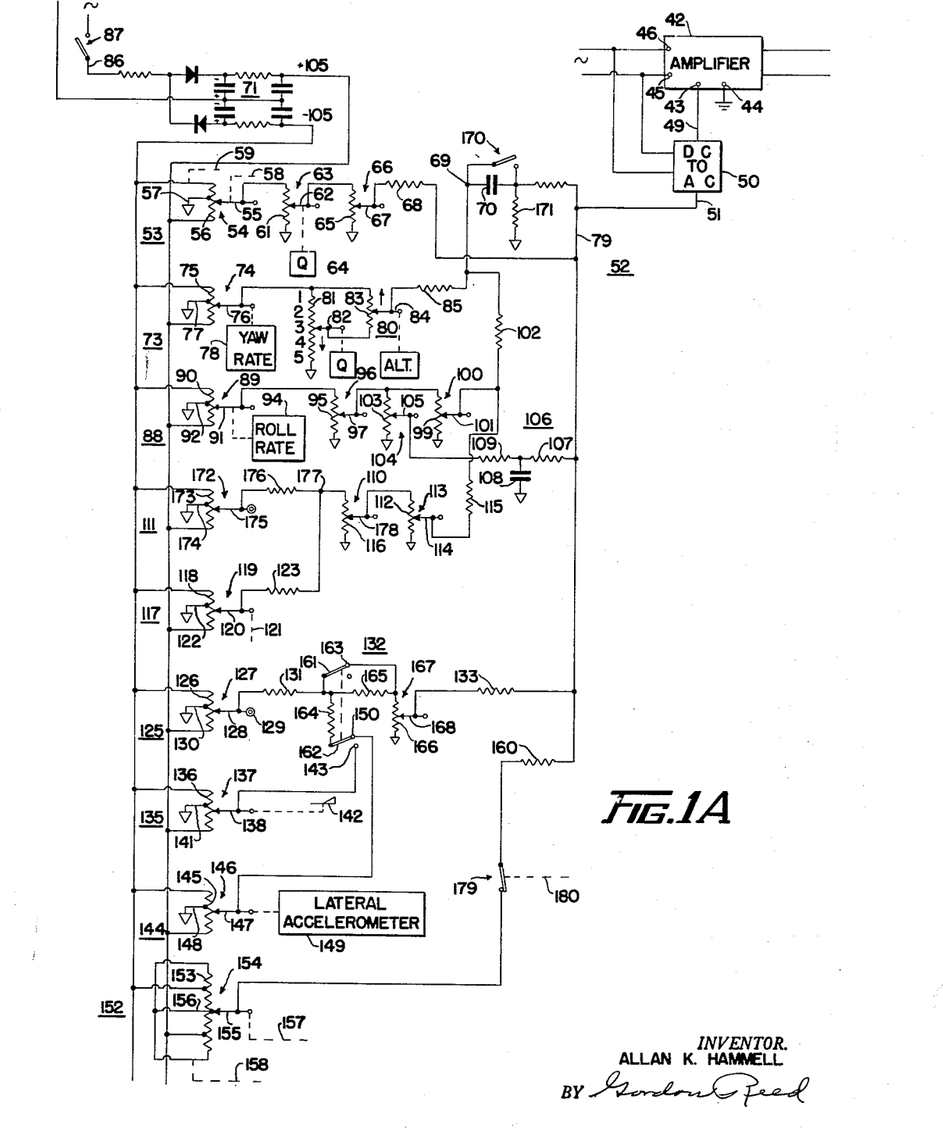
Figures 1A and 1B together form a schematic representation wherein a manual controller is combined with the novel damper arrangement for positioning an aircraft control surface.
Figures 1B, 2:
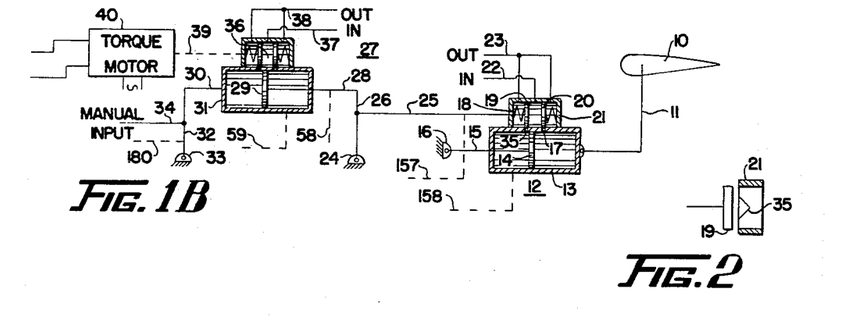
Figure 2 illustrates a portion of the servomotor for positioning the control surface with details of a valve and valve port for providing nonlinear flow.

Referring to Figure 1B, a rudder control surface 10 of an aircraft is operatively connected, through a member 11 fixed to surface 10, to a hydraulic servomotor 12. The servomotor 12 includes a ram 14 having a connecting rod 15 extending therefrom to a pivoted support 16 on the craft. The servomotor includes a movable cylinder assembly 13 which is the part of servomotor 12 connected to the member 11. Included in the cylinder assembly 13 are fluid admission and exit ports 35, 17 which are ordinarily blocked by lands 19 and 20 of a control valve. Conventional spring means are used to center the valve with respect to the ports 35 and 17. Hydraulic fluid from a pressure line 22 is supplied to the portion of a valve casing 21 between the lands 19, 20. A return line 23 has branches connecting with the ends of the valve casing 21 communicating with opposite sides of ram 14. The control valve is operated by a link 25 extending therefrom and connected to an intermediate point of a differential lever 26. Lever 26 is pivoted at one end on a base member 24 fixed to the craft. Differential lever 26 may be operated by a differential link comprising a connecting rod 28 extending between the free end of lever 26 and a ram 29 of a servomotor 27 and a connecting rod 30 extending between a free end of a further lever 32 and the cylinder assembly 31 of servomotor 27. The lever 32 is pivoted at its opposite end to a base member 33 fixed to the craft. A manually operated input member 34 is connected to an intermediate point of lever 32. In the above arrangement, the servomotor 27 when nonoperating serves substantially as a mechanical link between the connecting rod 30 and connecting arm 28. Additionally, motor 27 may be operated to move the lever arm 26 differentially or independently with respect to the lever 32.

The servomotor 27 may be similar generally to servomotor 12 and it includes a two land valve 36 spring centered to a position where fluid from a pressure line 37 will not enter the cylinder assembly 31 to operate ram 29. Outlet ports of the cylinder assembly 31 may be placed in communication with a return line 38. The valve 36 has an essentially linear flow characteristic and is linearly displaced in either direction by an operating means 39 connecting valve 36 with a torque motor 40. The torque motor 40 may be a capacitor type induction motor well known in the art having a line winding energized from an A.C. supply and an amplifier energized winding energized from an amplifier 42. The amplifier 42 may be an alternating voltage discriminator type having alternating voltage signal input terminals 43, 44 and alternating voltage power input terminals 45, 46. As well known in the art, dependent upon the phase relationship of the alternating voltage signal voltage across terminals 43, 44 with respect to the alternating voltage across the supply terminals 45, 46, the torque motor 40 will position valve 36 in either one or the other direction from center position against the resistance of the centering springs for the valve. The amplifier-servomotor arrangement may be of the type more fully disclosed in U.S. Patent 2,646,947, dated July 28, 1953.

Control signals are supplied to amplifier 42 by means of an output conductor 49 connecting amplifier 42 with a D.C. to A.C. converter 50. The converter 50 may be of the vibrator type and has its cycling member energized from the same alternating voltage supply as that for amplifier 42. Direct voltage control signals which are to be converted to alternating voltage signals are supplied to the converter 50 by conductor 51 connecting it with a control signal network 52.

Network 52 is a parallel summing direct signal voltage network comprising, a damper servo follow-up signal generator 53, a yaw rate signal generator 73, a roll rate signal generator 88, an aileron trim signal generator 111, an aileron position signal generator 117, a rudder trim signal generator 125, a side slip signal generator 135, a lateral acceleration signal generator 144, and a main servo control valve position signal generator 152.

Signal generator 53 comprises a potentiometer 54 having a resistor 56 and a slider 55 adjusted in either direction from a center tap 57 of the resistor which is connected to signal ground. The slider 55 is adjusted by suitable operating means 58 extending thereto from the connecting rod 28 of the damper servo 27, Figure 1B. The resistor 56 is adjusted by suitable operating means 59 extending thereto from the cylinder assembly 31 of the damper servomotor 27, Figure 1B. A ratio potentiometer 63 has a resistor 61 connected between slider 55 and signal ground. Slider 62 of the ratio potentiometer is adjusted along resistor 61 by a Q sensor 64 which is responsive to the speed of the craft and it is adjusted by the difference of the total or impact pressure and the static pressure on the aircraft while in flight. A resistor 65 of a follow up adjustment potentiometer voltage divider 66 is connected between slider 62 and signal ground. A slider 67 of the potentiometer 66 is adjustable along resistor 65. A summing resistor 68 connects slider 67 to a summing conductor 79 of network 52. The voltage source for signal generator 53 which is also the source for the other signal generators may be derived from a voltage doubler 71 which is connected to an A.C. supply through a conductor 86 and single pole single throw switch 87. The potentiometer resistor 56 is connected across the output of the voltage doubler 71 and the doubler includes a signal ground connection.

Signal generator 73 comprises a potentiometer 74 having a resistor 75 connected across the output conductors of the voltage doubler and a slider 76 adjusted along resistor 75 in either direction from its center tap or null point 77 connected to signal ground. Slider 76 is operated by a rate sensing device such as a yaw rate gyroscope 78 responsive to the rate of turn of the craft about its vertical or turn axis. Connected between slider 76 and signal ground is a resistor 81 of a novel voltage dividing arrangement 80. An adjustable tap 82 adjusted according to the direction of the arrow associated with tap 82 for increase in magnitude of the quantity Q has extending therefrom a resistor 83 which connects to the end of resistor 81 remote from signal ground. An adjustable tap 84 adjusted in accordance with the direction of the arrow associated with tap 84 for increases in craft altitude along resistor 83 is connected through a summing resistor 85 to a summing point terminal 69. A capacitor 70 connects terminal 69 and summing conductor 79.

Roll rate signal generator 88 comprises a roll rate potentiometer 89 having a resistor 90 connected across the output conductors of the voltage doubler and a slider 91 displaced in either direction from a grounded center tap 92 of resistor 90. Slider 91 is operated from a roll rate sensing device 94 which may be a conventional rate or velocity type gyroscope. The gyroscope is arranged so that its displacement is proportional to the craft roll rate. A resistor 95 of a voltage dividing potentiometer 96 is connected between slider 91 and signal ground. Adjustable tap 97 of potentiometer 96 is connected to one end of a resistor 99 of a ratio potentiometer 100, the opposite end of resistor 99 being connected to signal ground. Potentiometer 100 includes an adjustable tap 101 for resistor 99. Slider 101 is connected through a summing resistor 102 to summing point 69 to supply a roll rate signal. Additionally, slider 97 is also connected to one end of a resistor 103 of a voltage dividing potentiometer 104. The opposite end of resistor 103 is connected to signal ground, and it has an adjustable tap 105 which is connected through a lag network 106 to conductor 79. The lag network comprises a resistor 109 and a resistor 107 connected in electrical series between tap 105 and summing conductor 79. A capacitor 108 extends from the junction of the two resistors 109, 107 to signal ground. By means of the lagged roll rate signal derived from network 106 there is obtained a control effect which is a substitute for the heretofore provided dynamic coordination obtained from a displacement roll angle effect derived from a vertical gyroscope.

Signal generator 111 comprises a trim potentiometer 172 having a resistor 173 connected to the direct voltage supply from the voltage doubler and an adjustable slider 175 displaceable relative to a center tap 174 of resistor 173. A summing resistor 176 connects slider 175 to a summing point terminal 177. A resistor 116 of a voltage divider 110 is connected between summing point terminal 177 and signal ground. An adjustable tap 178 coacts with resistor 116 and has extending therefrom a resistor 112 of an aileron adjustment voltage divider 113 having an adjustable tap 114. A summing resistor 115 connects adjustable tap 114 through series summing resistor 102 to the summing point 69.

Signal generator 117 comprises a resistor 118 of an aileron position potentiometer 119 which includes an adjustable slider 120 positioned relative to a center tap 122 of the resistor. Slider 120 is positioned by suitable operating means 121 which is displaced in accordance with the ailerons (not shown) of the aircraft. Slider 120 is connected through a summing resistor 123 to the summing point 177.

Signal generator 125 comprises a resistor 126 of a rudder trim potentiometer 127 having a slider 128 displaced along a resistor 126 with respect to a center tap 130 thereof. Slider 128 is positioned by suitable operating means 129. A resistor 131 has one end connected to slider 128 and its opposite end connected in series with a resistor 165 to a resistor 166 of a voltage dividing potentiometer 167. Coacting with resistor 166 is an adjustable tap 168 which in turn is connected through a summing resistor 133 to summing conductor 79. The said opposite end of resistor 131 is also connected to a switch arm 161 of a switching arrangement 132 and in the position shown in the drawing, switch arm 161 coacts with a switch contact 163 to bypass resistor 165.

Signal generator 135 comprises a side slip responsive potentiometer 137 having a resistor 136 connected to the direct voltage supply. Potentiometer 137 includes a slider 138 positioned relative to a center tap 141 of resistor 136 by a vane 142 responsive to the side slip of the aircraft. Slider 138 is connected to a contact 143 of switching arrangement 132. Switching arrangement 132 includes an operable arm 162 jointly operated with switch arm 161 and which in the downward position in the figure connects slider 138 through a resistor 164 and resistor 165 in series to the resistor 166 of voltage dividing potentiometer 167.

Signal generator 144 comprises a lateral accelerometer responsive potentiometer 146 having a resistor 145 connected to the direct voltage supply. Potentiometer 146 includes an adjustable slider 147 displaced relative to a center tap 148 of resistor 145 by an accelerometer 149 responsive to lateral linear accelerations of the craft. Slider 147 is connected to a terminal 150 in the switching arrangement 132. In the present position of the switching arrangement shown, terminal 150 is engaged by switch arm 162 to thus connect slider 147 through resistor 164 and resistor 165 to the resistor 166 of voltage dividing potentiometer 167.

Main servo control valve position signal generator 152 includes a characterized resistor 153 connected at intermediate points across the direct voltage supply. Resistor 153 comprises a portion of a potentiometer 154 having an adjustable slider 155 displaceable relative to a center tap 156 of the resistor. Slider 155 is connected through a summing resistor 160 and normally closed single throw switch 179 to the summing conductor 79. Slider 155 is positioned by suitable operating means 157 extending thereto from the rod 28 connected also to main servo valve operating link 25 whereas resistor 153 is positioned by suitable operating means 158 extending thereto from the cylinder assembly 13 of the main servo 12. Potentiometer resistor 153 is characterized so as to give an output voltage variable with valve displacement similar to curve E, Figure 5 so that the voltage output provides the desired gain so that the system approaches linearity.

Reverting to consideration of the main servo 12, there is shown in Figure 2 a sectional detail of the control valve and fluid passage through which passes fluid that operates the ram 14. As will be noted, the port 35 which admits fluid to the left side of the ram 14 has an exaggerated V or notch shape. When the land 19 in Figure 2 is in its normal position it blocks the port 35. As the valve is moved toward the left from its blocking position, it will reach a position wherein a small portion of the port is uncovered. It will be evident that for equal increasing displacements of the land 19 that a larger portion of the notch 35 is uncovered. Because the uncovered area of the valve port 35 does not increase linearly with equal displacements of the land 19 the rate of flow through the valve port is a non-linear function of the displacement of the control valve. The variation of flow through the valve port for displacements of the valve assumes a parabolic form as illustrated by dotted curve A in Figure 4.

This non-linear rate of flow with respect to valve displacement is the type of operation of the servo motor 12 that is desired when direct manual inputs are obtained from the manual operating means 34. Thus, with the damper servo motor 27 not operating, the pilot may operate the member 34 with the main servo motor 12 providing a "loose" control when the manual operator 34 is near its normal position so that small manual movements result in no substantial rudder movement. Thus the sensitivity of the servomotor 12 is low for small displacement of the manual operator 34. However, if the pilot wishes a rapid operation of the servomotor 12 he may displace the operating means 34 a considerable extent at which time the servomotor 12 will give him the desired operation.

However, while such non-linear flow satisfies manual control requirements, such non-linear control is not satisfactory for automatic control of the servomotor 12 through the damper servo motor 27. To maintain a tight automatic control loop through the damper servo motor 27 the flow characteristics of the main servo valve should be linear as shown in curve D of Figure 4. By linear flow characteristic, it is contemplated that the torque or displacement of the ram 14 of the main servomotor is proportional to the input control signal which operates the damper servomotor 27.

The novel apparatus for providing substantially linear operation of the main servomotor 12 from inputs $\theta_i$ during operation of the damper servomotor 27 from network 52 is explained below. This explanation is given with respect to a block diagram shown in Figure 3. In the block diagram, the various portions thereof have been given reference characters which identify similar structure in the diagrammatic arrangement of Figures 1A and 1B. It was determined that the power actuator output of servomotor 12 may be substantially linearized by feeding the signal provided by signal generator 152, Figure 1A operated in accordance with the main servomotor control valve displacement relative to casing 13 to the control network 52 which controls the damper or differential servomotor 27. The ascertainment of the gain control, N, which has been embodied in potentiometer resistor 153, for the control valve displacement is set forth below using conventional notations of a closed loop system.

Notation:

$\theta_i$ = electrical input to differential servo.

$\theta'$ = output of differential servo with respect to airframe reference.

$x$ = main servo valve displacement.

$\theta_o$ = power actuator output.

$N$ = gain factor on valve displacement feedback.

$f(x)$ = non-linear gain factor of main servo control valve, i.e. Rate of Flow vs. Valve Displacement.

$K$ = gain factor of power cylinder, or $$\frac{1}{A}$$

where $A$ = area of the ram head receiving the output from the control valve.

$$S = \frac{d}{dt}$$

By neglecting the power cylinder lag and by assuming that the closed loop differential servo has a unity transfer function, and with X phased to give positive feedback the transfer function of the entire system may be derived as follows:

$$\theta_o = \frac{k}{s}f(x)x$$

$$x = \theta' - \theta_o$$

$\theta_o$ is a mechanical follow up herein derived by displacing valve casing 21.

$$\theta' = \theta_i + N(\theta' - \theta_o) = \frac{\theta_i - N\theta_o}{1-N}$$

Then $$x = \frac{\theta_i - N\theta_o}{1-N} - \theta_o = \frac{\theta_i - N\theta_o - \theta_o + N\theta_o}{1-N} = \frac{\theta_i - \theta_o}{1-N}$$

$$\theta_o = \frac{k}{s}f(x)\frac{\theta_i - \theta_o}{1-N}$$

$$\frac{\theta_o}{\theta_i} = \frac{1}{\frac{1-N}{Kf(x)}S+1}$$

If $$\frac{1-N}{Kf(x)} = \tau = \text{Constant}, \quad \frac{\theta_o}{\theta_i} = \frac{1}{\tau S+1}$$

The transfer function $$\frac{\theta_o}{\theta_i}$$

is a first order lag with a time constant $\tau$. $\tau$ is the time constant of the system of which $\theta_i$ and $\theta_o$ are input and output quantities and is the time required for the output $\theta_o$ to attain to some proportion of the input $\theta_i$. The feedback gain N may be solved as $$N = 1 - \tau K f(x)$$

Figure 4:
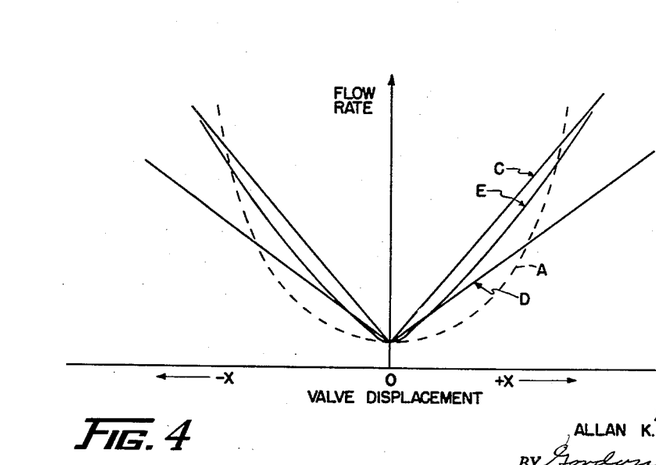
Figure 4 illustrates curves of various valve flow characteristics, one representing the non-linear flow characteristics of the control valve and other optimized curves during damper control.

In Figure 4 and considering non-linear flow rate curve A and linear flow rate curve D, at their cross over point remote from the origin, the non-linear valve flow rate is in accord with a linear valve flow rate. No positive feedback NX is required. As we move down the curves toward the origin, the linear flow rate curve D is above the non-linear curve A. In order to obtain linear performance corresponding with curve D for a given input $\theta_i$, an additional displacemnet $\Delta X$ must be given to the valve of the main servomotor. This additional displacement is the difference of the abscissae of curves A and D for a selected magnitude of ordinate.

Figure 3:
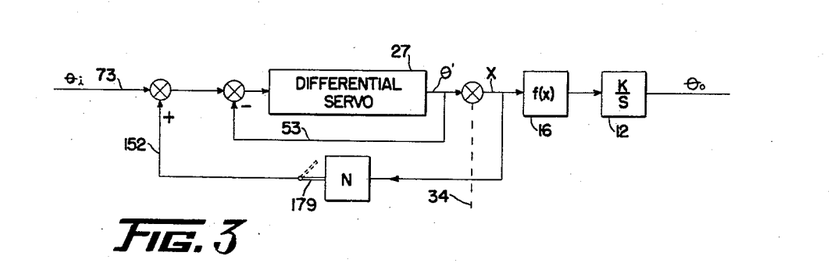
Figure 3 is a block diagram of the combined manual and yaw damper system.
Figure 5:
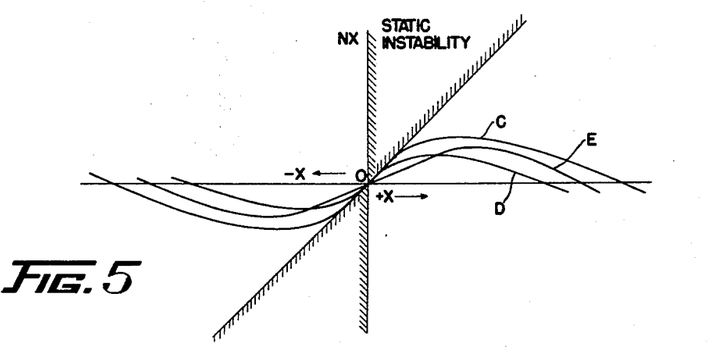
Figure 5 is a graphical representation of qualities of a gain control for optimizing the control valve flow.

To obtain a linear system from values of $\theta_i$ Fig. 3, the required characterization of the main servomotor valve displacement feedback potentiometer 154 is shown by curves C and D in Figure 5 by using two different values of time constant $\tau$. For stability of the system, N should not be greater than one, otherwise the time constant would be negative. The characterized feedback curve should fall below the line having a slope of N.

Since the system is near static instability, due to no appreciable feedback from movement of cylinder assembly 13 at low values of X so that $X = \theta'$ thereby feedback NX cancels feedback $\theta'$, it is desirable to reduce the feedback signal NX by reducing N at low X values as shown by curve E in Figure 5. This reduces the likelihood of differential servo 27 overshooting the balance point of the valve during reversal of the servo 27. The effective flow characteristics for the various feedback curves are shown in Figure 4.

Although the effective flow characteristic is not actually linear for curve E, the effective deadspot as indicated by curve A, Figure 4 in the region of low gain should be sufficiently reduced.

The simplicity of the described system is a major advantage. The system is also desirable since it does not affect the autopilot control system and there is no motion transmitted to the pilots operated member 34 when differential servo 27 is used. The principle of valve displacement feedback may be used in systems with either a differential servo, a parallel servo, or both.

The valve displacement positive feedback signal from potentiometer 154 is used to maintain precise control at all times except when the pilot applies force on member 34 while in the damper mode. In this case, the feedback signal can be attenuated or dropped entirely by opening switch 179 to provide the loose control for the pilot.

The use of valve displacement positive feedback will improve the nonlinear characteristics of the power actuator. The system is quite simple and has the following advantages.

(1) The autopilot configuration is not affected.
(2) There is no motion of manual member 34 due to valve displacement when differential servos are used.
(3) The system may be used at all times except during pilot initiated maneuvers on the damper mode.
(4) It is possible to adjust the effective time constant of the system as well as remove the non-linear effects.

Figure 8:
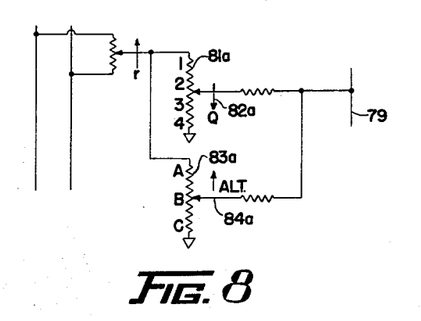
Figure 8 is one form of yaw rate signal scheduling used for explanation.

Returning to the balanceable network 52, the scheduling circuit 80 associated with the yaw rate potentiometer 74 in signal generator 73 reduces the maximum yaw rate gain required and provides gain scheduling in accordance with Q and altitude which is more desirable than that obtained by previous methods such as that illustrated in Figure 8. The arrangement is particularly useful where it is desired to utilize a less sensitive rate gyroscope for the presently used more sensitive rate gyroscope. For example, it may be desirable to substitute a 12 degree per second yaw rate gyroscope in place of a 6 degree per second yaw rate gyroscope. The scheduling configuration of arrangement 80 provides for a lower maximum gain and thus permits the use of the 12 degree per second gyroscope. One form of the proposed yaw rate scheduling configuration is shown in network 52 and separately in Figure 6. The output shape differs considerably from that provided by the arrangement of Figure 8.

Figure 6:
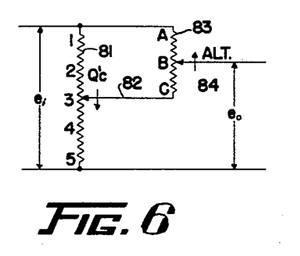
Figure 6 illustrates a form of gain or scheduling for the yaw rate signal.
Figure 7:
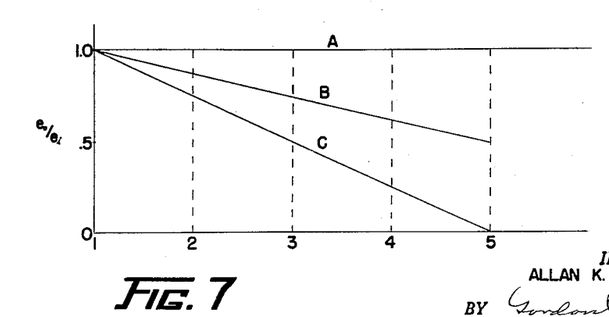
Figure 7 is a graphical illustration of the type of feedback scheduling from the structure of Figure 6.

On reference to Figure 7 based on Figure 6 and assuming linear potentiometers with negligible loading effects, the voltage ratio $$\frac{e_o}{e_i}$$

has a characteristic as shown in various curves in Figure 7. It will be noted that the abscissa points 1–5 of Figure 7 correspond to various points or Q values on the resistor 81, Figure 6. The points A, B and C on resistor 83, Figure 6 correspond with various altitudes. The direction of increasing Q values is indicated by the direction of the arrow on slider 82 and likewise the direction of increasing altitude as indicated by the arrow on slider 84. It is evident that the output $e_o$ giving greatest surface displacement should be the greatest for the highest altitude and lowest Q value. However, lower altitudes is a factor which aircraft must contend with and these lower altitudes determine the minimum gain permissible.

Figure 9:
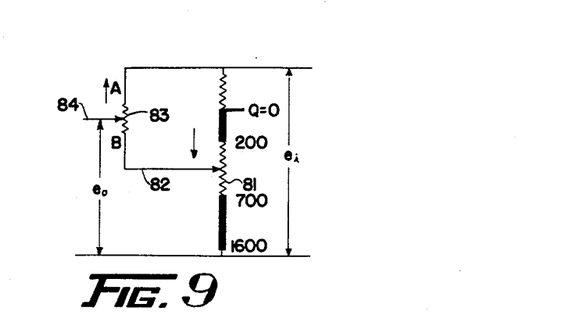
Figure 9 is a part of the preferred form of feedback or gain control for the yaw rate gyroscope signal.
Figure 10:
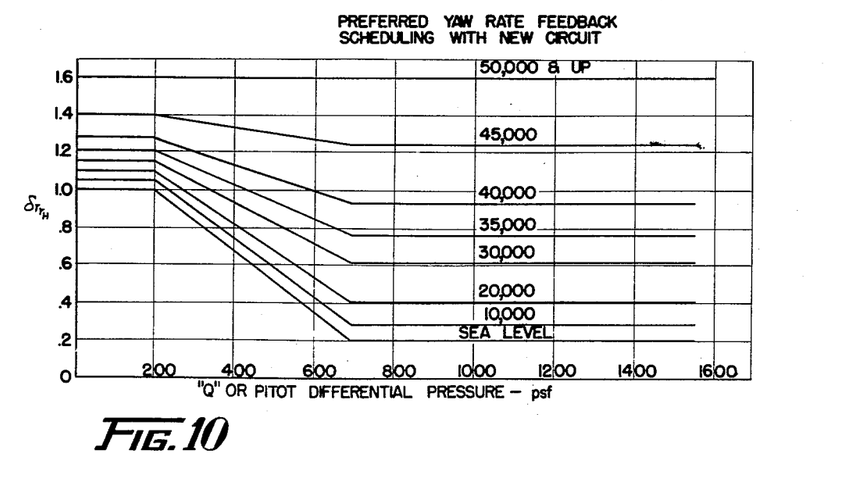
Figure 10 are curves of yaw rate signal at various Q pressures and altitudes based on the structure of Figure 9.

A preferred configuration of arrangement 82 is shown in Figure 9 which shows the resistor 81 metalized between the values of Q between 0 and 200 and also metalized between values of Q between 700 and 1600. The resistor 83 otherwise, however, is linear as before. Figure 10 shows the type of scheduling provided by the arrangement of Figure 9. The abscissa indicates increasing values of Q and the ordinates indicates the rudder displacement per degree per second of yaw rate of the craft. By referring to Figure 10 in conjunction with Figure 9, if we place slider 82 at the point where Q has a magnitude marked 700 on resistor 81 and if we place slider 84 at point B on resistor 83 we obtain from output $e_o$ a certain rudder displacement per degree per second of yaw rate. By maintaining slider 82 at the assumed position on resistor 81 and by moving slider 84 upward it is evident that as altitude increases, we increase the amount of rudder displacement per degree per second of yaw rate. When slider 84 is at the upper end of resistor 82 we obtain the full output $e_o$ which is equal to $e_i$. This is so irrespective of the position of slider 82 on resistor 81. Since the craft as stated must fly at low altitudes and since the requirements of proper control demand a suitable value of $e_o$ for values of $e_i$ it will be noted that with slider 84 at the lower altitude B, that as we decrease Q by moving slider 82 upwardly until we reach a value of Q of 200, see Figure 10, that the rudder displacement per degree per second yaw rate is equal to one. This is the value that has been determined as necessary in order to properly automatically control the craft. By reference to the maximum altitude line and the values of Q below 700 it is evident that the maximum rudder displacement per degree per second of yaw rate is 1.6.

Figure 11:
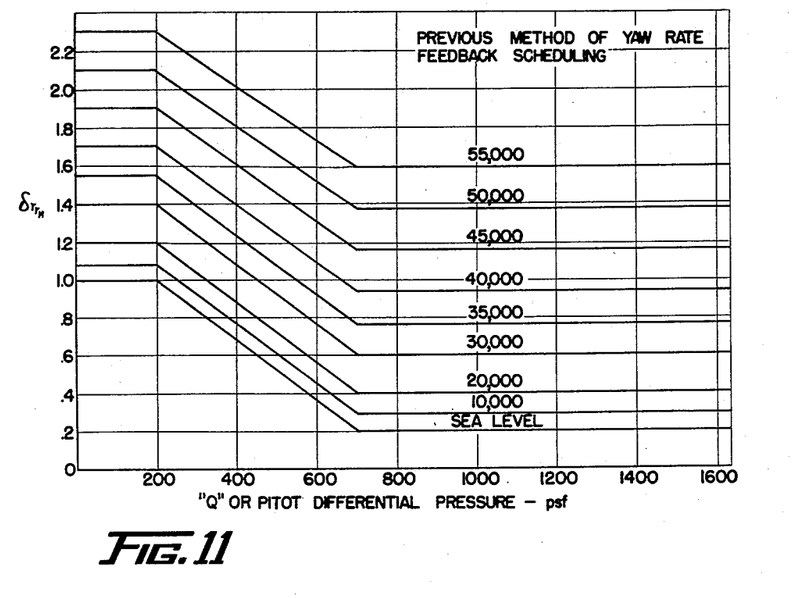
Figure 11 are curves of yaw rate signal at various Q pressures and altitudes based on the structure of Figure 8.

The advantage of the above arrangement over that shown in Figure 8 may be had by comparing Figure 10 with Figure 11 which is based on Figure 8. In Figure 8, resistor 81a and slider 82a as well as resistor 83a and slider 84a correspond with resistor 81, slider 82, resistor 83, and slider 84 of Figure 1A. By reference to Figures 10 and 11 it is apparent that at sea level altitude and a value of Q of 700 that we require a rudder displacement per degree per second of yaw rate of .2. Similarly at the same altitude but at a value of Q of 200, we require a rudder displacement per degree per second of yaw rate of 1.0. By reference to Figure 8, sea level altitude corresponds with the lower position of slider 84a. With the lower position of slider 84a and slider 82a positioned to correspond with a value of Q of 700 and if we decrease the value of Q to a value of 200 we reach the ordinant of 1.0 rudder displacement per degree per second yaw rate. However, if we place the slider 84a at a point corresponding with an altitude of 55,000 feet and if we again decrease Q from a value of 700 to a value of 200 we reach a point where the rudder displacement per degree per second yaw rate is equal to 2.3.

This amount of rudder displacement per degree per second is very undesirable since it causes the aircraft to be sluggish and overdamped at high altitudes, low Q conditions. The arrangement of Figure 9 for scheduling the yaw rate signal from potentiometer 74 into the summing conductor 79 does not require such a high maximum gain in order to provide the proper values of gain at lower altitudes and low values of Q. In other words the arrangement of Figure 9 provides a maximum gain of 1.6 as compared with 2.3 for the arrangement of Figure 8. As stated, with a smaller value of maximum gain, the aircraft will not have its rudder control surface displaced as to cause sluggish response of the aircraft.

Operation

With the manually operable switch 87, Figure 1A in position the bridge supply 71 is not operating, the fluid supply to damper servo 27 is cutoff and piston 29 is mechanically centered and locked conventionally, see for example application Serial No. 491,847, March 3, 1955. At this time by means of the manual input member 34, the pilot may directly position the control valve of the main servomotor 12 to control the rudder surface 10 of the craft; and in conjunction with manual operation of ailerons and elevator may place the craft in position for automatic control. At this time, nonlinear control of the motor 12 is provided by the valve.

With the switch 87 moved to closed position, the signal generators in the bridge 52 are energized, and the network 52 may be adjusted in anticipation of automatic damper control. To this end, the aileron trim potentiometer 172 may have its slider adjusted to compensate for any signal derived from potentiometer 119. Similarly, the rudder trim potentiometer slider 128 may be adjusted to compensate for any signal from the follow-up potentiometer signal generator 53. At this time, the single pole switch 170 is placed in closed position.

After the aircraft is airborn and placed in a desired attitude and heading as stated through direct manual control, damper control from network 52 may be applied. In yaw oscillations, the yaw rate gyroscope 78 provides a signal in network 52 to affect operation of the damper servo motor 27 which positions follow-up slider 58 and the control valve of the main servo 12. Servo 12 operates the rudder surface 10 to damp out the aircraft yaw oscillations.

The network 52 additionally functions during ordered banked turns in that when the ailerons of the aircraft are operated to bank the craft, such displacement through the operating means 121 displaces slider 120 in signal generator 117 to unbalance the damper network 52 and cause operation of the damper servo 27. Servomotor 27 through the main servo 12 effects the operation of the rudder surface 10. Since the aircraft is turning, an opposing signal is also provided by the yaw rate signal generator 73. At this time, with the switch 170 opened the signal from the yaw rate gyroscope must pass through the capacitor 70. Thus, during the steady state portion of the banked turn, when the yaw rate signal does not vary, there is no control effect in network 52 from the rate gyroscope 78. It will be noted that at the summing point 69 that damper servo displacement, yaw rate, roll rate, and aileron position are summed and are high passed through capacitor 70 to the summing conductor 79. This signal is summed with the lagged roll rate signal from network 106 to provide dynamic coordination of the rudder during the craft entry and recovery from the banked turn.

Since the aileron surfaces are conventionally moved to unoperated position when the craft has attained a desired banked attitude, it is apparent that the damper servomotor 27 controls its ram 29 so that it is in its normal position during the steady state part of the turn.

By means of the control valve position signal generator 152 operated through the gain control N in accordance with the control valve position of the main servomotor 12, the displacement of ram 14 of the servomotor 12 is substantially equal to the magnitude of the control signal derived from the balanceable network 52 and applied to the servo amplifier 42.

When coordination of the craft in a banked turn is not correctly affected from the yaw rate gyroscope, additional correction is supplied either by the side slip sensing vane 142 or the lateral accelerometer 149 to provide any necessary rudder correction in order to effect proper coordination between the operation of the rudder and ailerons. Consequently, the craft side slip or lateral acceleration of bank turn is corrected.

When the network 52 is controlling the damper servomotor 27 during automatic flight control and it be desired to operate the rudder surface manually from the manual input member 34 a switch operator 180 extending from member 32 to switch 179 may open the single pole-single throw switch 179 connected between slider 155 and summing resistor 160. With the switch 179 in open position, there is no feedback to network 52 from the main servo control valve displacement signal generator 152. Thus, non-linear operation of the servomotor from the manual controller 34 is selectively provided.

Reverting to network 52, it is evident that we obtain generally the same result by passing the roll rate signal through lag network 106 as we would have obtained had we taken a conventional roll attitude displacement signal from a vertical gyroscope and passed it through the high pass capacitor 70. Consequently, since by high passing the roll attitude signal we can prevent any steady state signal and thereby obtain a proper trim of the craft the same effect is obtained by passing the roll rate signal through the lag network 106.

It will now be apparent that there has been provided a novel yaw axis control system for an aircraft automatic pilot which damps out yaw oscillations of the aircraft and effects a coordinated operation of the rudder surface in consequence of operation of aileron surfaces of the craft. Additionally there has been provided an arrangement for linearizing, when on automatic control, the operation of a hydraulic servomotor of the rudder surface which has normally nonlinear operation and additionally there has been included a novel gain or scheduling arrangement for the yaw rate signal which provides the proper control for all conditions of aircraft altitude and Q values without exceeding a desired maximum gain.

While a preferred embodiment has been disclosed, it is realized that many changes could be made in the detailed arrangements and construction of the elements without altering the scope of the invention, consequently the invention is to be limited by the accompanying claims.

What is claimed:

1. In flight control apparatus for an aircraft having a hydraulic servomotor or power cylinder controlled by a valve for positioning craft attitude control means, said valve having a nonlinear volume rate flow characteristic relative to its displacement and being positionable by manual means; differential means for also positioning said valve independently of said manual means including a servo mechanism of the negative feedback self rebalancing type; and positive feedback means responsive to relative displacement of said valve and servomotor and controlling said servo mechanism, said positive feedback means including a gain control which modifies the positive feedback from the valve and hydraulic servomotor relative displacement in accordance with a function varying with the gain ($\frac{1}{A}$) of the hydraulic servomotor or power cylinder, a function of valve displacement, and the time constant of the closed loop transfer function of the servo mechanism and hydraulic servomotor in combination.

2. The apparatus of claim 1, and selective means for attenuating the controlling effect of said control valve and hydraulic servomotor relative displacement feedback means, to provide loose or nonlinear control of said hydraulic servomotor by said manual means.

3. In flight control apparatus for an aircraft having a hydraulic servomotor controlled by a displaceable valve for positioning craft attitude control means said valve having a flow characteristic which is nonlinearly proportional to its displacement and being manually positionable: differential means for also positioning said control valve independently of said manual means including a servo mechanism of the rebalancing type, said servo mechanism comprising, a motor, a balanceable network connected thereto and responsive to the craft rate of change of attitude and to the extent of operation of said motor; and feedback means additionally controlling said network and responsive to displacement of said displaceable control valve.

4. In control apparatus, a servomotor having a biased displaceable control valve; means including a balanceable voltage network operating said valve on unbalance of the network; a rate gyroscope sensing rate of angular movement; a signal generator operated by said gyroscope; a scheduling circuit connected to said generator and having an output varying with a pressure quantity Q obtained from impact pressure minus static pressure and a pressure quantity indicative of altitude, said circuit comprising a potentiometer voltage divider having a resistor with one end thereof connected to said signal generator and its opposite end connected to a null point of said generator, a slider positioned along said resistor in accordance with the quantity Q, a second potentiometer voltage divider including a resistor connected at one end to said signal generator and its opposite end connected to said first slider and having a second slider adjustable along said second resistor in accordance with altitude and connected to said network to effect unbalance thereof.

5. Flight control apparatus for an aircraft having attitude changing means controlling craft attitude about its vertical or turn axis, said apparatus comprising: a servo motor operating said attitude changing means; means including a balanceable voltage network operating said motor on unbalance of the network; a rate gyroscope sensing rate of angular movement about said turn axis; a signal generator operated by said gyroscope and having an output member and null point; a scheduling circuit connected between said signal generator and said network said scheduling circuit comprising a ratio device connected across said signal generator output member and null point and modifying an output from the signal generator in accordance with one variable Q obtained from impact pressure minus static pressure affecting the craft flight and a second ratio device connected across said signal generator output member and an adjustable member of said first ratio device and means connecting an adjustable member of the second ratio device to said network.

6. In an automatic control apparatus having a control device for controlling a condition and including a servomotor operating said device; a balanceable voltage network operating said motor on unbalance of the network; a device responsive to the rate of change of said condition; a signal generator, having an output member and null point, operated by said device; means connected between said signal generator and said network for modifying the output of said signal generator to said network comprising a potentiometer voltage divider having a resistor with one end thereof connected to said output member of said signal generator and its opposite end connected to said null point of said generator, a slider positioned along said resistor in accordance with one variable, a second potentiometer voltage divider including a resistor connected at one end to said output member of the signal generator and its opposite end connected to said first slider, said second potentiometer having a second slider adjustable along said second resistor in accordance with a second variable; and means connecting said second slider to said network.

7. In flight control apparatus for an aircraft having a control surface for controlling craft attitude about an axis and a servo motor operating said surface, in combination: a balanceable control system operating said servomotor on unbalance of the system; a device responsive to a function of the displacement of said craft about said axis, a signal generator operated by said device and having an output member and a null point; a gain control arrangement connected to said generator and having an output connected to said balanceable control sytsem, said arrangement comprising a first ratio device for deriving a signal which is a ratio of the signal from said generator, said first ratio device having a fixed member connected across said output member and null point of said signal generator and and adjustable device and said arrangement including a second ratio device having a fixed member connected between said signal generator output member and the adjustable device of said first ratio device said second ratio device including an adjustable member connected to said system.

8. A yaw damper control apparatus for an aircraft having a control surface for controlling its attitude about the turn or yaw axis comprising: a servomotor operating said surface; means including a balanceable, parallel summing, direct voltage signal network operating said servomotor on unbalance of the network; a craft turn rate responsive direct voltage signal generator; a craft roll rate responsive direct voltage signal generator; first connecting means including a capacitor in series with the turn rate and roll rate voltage signal generators for supplying only transient effects from said signal generator to said network and further connecting means in said network between said roll rate direct voltage signal generator and said network comprising a lag device for supplying lagged roll rate signals to said network.

9. Control apparatus for an airplane having aileron control surfaces and a rudder control surface, comprising: a servomotor operating said rudder surface; a balanceable network controlling said servomotor; means for unbalancing said network in response to operation of the ailerons of said aircraft; a craft turn rate responsive signal generator, a craft roll rate responsive signal generator; means including a high pass transmitting means connecting said turn rate and roll rate signal generators in said network to permit application to said network of only transient changing turn rate and roll rate signals; and further means connecting said roll rate signal generator to said network comprising a lag device, to effect transient coordination of the aircraft in banked turns.

10. A yaw damper control apparatus for an aircraft having aileron and rudder control surfaces, said apparatus comprising: a servomotor operating said rudder surface; means including a balanceable, D.C. summing, direct voltage network operating said servomotor on unbalance of the network; means responsive to operation of the aileron surfaces generating a direct voltage signal for unbalancing said network; a craft turn rate responsive direct voltage signal generator; a craft roll rate responsive direct voltage signal generator; means combining said aileron position, craft turn rate and craft roll rate signals; means included in said network including a series capacitor for connecting said combining means to said network; and a lag device for additionally connecting the roll rate signal in said network to coordinate operation of said rudder during banking of said aircraft by operation of said ailerons.

11. In an aircraft having aileron and rudder control surfaces, means for controlling the rudder surface comprising first means including a servomotor operating said surface; means including a balanceable parallel summing direct voltage network connected to said first means and operating the servomotor on unbalance of the network; a signal generator operated on displacement of the aileron surfaces of the craft; a craft turn rate responsive signal generator; a craft roll rate responsive signal generator; means connecting said three signal generators in said network including a capacitor in series with said signal generators to prevent application in said network of steady state signals in any of said signal generators; and further means separately connecting said roll rate signal effectively in said network comprising a lag device.

12. Control apparatus for an aircraft having aileron control surfaces and rudder control surfaces with means for operating said aileron control surfaces, said apparatus comprising: a servomotor operating said rudder surface; means including a balanceable parallel summing direct voltage network operating said servomotor on unbalance of the network; a craft turn rate responsive direct voltage signal generator having an output member and a null point; a scheduling circuit connecting said turn rate signal generator and said network said scheduling circuit comprising a potentiometer voltage divider having a resistor one end thereof connected to said output member of said signal generator and its opposite end connected to said null point of said generator, a slider positioned along said resistor in accordance with a function of the airspeed of the craft, a second potentiometer voltage divider including a resistor connected at one end to the output member of said signal generator and its opposite end connected to said first slider and having a second slider adjustable along said second resistor in accordance with the altitude of the craft and connected in said network; a craft roll rate responsive direct signal generator in said network and an aileron position signal generator connected in said network to initiate operation of the rudder upon operation of aileron surfaces of the craft to effect banked turns of the craft.

13. Control apparatus for an aircraft having aileron and rudder control surfaces and means for operating the aileron control surfaces, said apparatus comprising a main, rudder operating hydraulic servomotor having a displaceable control valve, said valve having nonlinear flow characteristics so that the volume rate of flow therethrough is not proportional to valve displacement; differential means including a manually operable member and a damper servomotor for positioning said control valve; means including a balanceable network operating said damper servomotor on unbalance of said network; a signal generator responsive to aileron positioning for unbalancing said network; a follow-up signal generator operated by the damper servomotor and connected in said network; a main servo control valve position signal generator in said network; and operating means for positioning said last named signal generator in accordance with the relative displacement of the main servo control valve and hydraulic servomotor said operating means including a nonlinear gain control.

14. Control apparatus for an aircraft having a rudder control surface and a main hydraulic servomotor or power cylinder positioning said surface, said servomotor having a control valve with a nonlinear flow characteristic whereby its volume rate is not proportional to valve displacement, said apparatus comprising: motor means for positioning said control valve; a balanceable network operating said motor means on unbalance thereof; first means effective to unbalance said network to cause operation of said motor means; follow-up means driven by said motor means for rebalancing said circuit; further means in said network comprising a signal generator in said network for linearizing the operation of said hydraulic servomotor from said main control valve displacement whereby to obtain substantially the same time constant for operation of said main hydraulic servomotor for all values of control signals in said network irrespective of the magnitude of such control signals; and means for operating said further means in accordance with the relative displacement of said main servomotor control valve and servomotor including a gain control and having a characterization equal to $$1-\tau K f(x)$$

wherein $\tau$=the time constant of the closed loop transfer function of the motor means-main hydraulic servomotor, $K$=the gain factor of the main hydraulic servomotor, and $f(x)$ is the gain factor of the control valve.

15. In control apparatus having a device for controlling a condition in combination: motor means operating said device; a balanceable network controlling said motor means to effect operation thereof on unbalance of said network; a signal generator having a null point and developing a signal variable in magnitude; a gain control circuit means connecting said signal generator into said network, said gain control circuit means comprising two potentiometers having two resistors and two adjustable sliders both resistors being connected at one end thereof to an output member of the said signal generator the remaining end of the first resistor being connected to the null point and the remaining end of the second resistor connected to said first slider whereby the maximum output derived from the positioning of the second slider relative to its resistor determines the maximum output of the gain control circuit means irrespective of the position of the first slider, and for various positions of the second slider, sequential movement of the first slider along its resistor effects the linear variation of the output at a different slope for each position of the second slider.

16. In flight control apparatus for an aircraft having a hydraulic servomotor or power cylinder controlled by a slide valve for positioning craft attitude control means, said valve having a nonlinear volume rate flow characteristic relative to its displacement from a normal position and being positionable by manual means; differential means for also positioning said valve independently of said manual means including a servomechanism of the negative feedback self rebalancing type; means responsive to a flight condition of said craft controlling said servomechanism; means compensating for nonlinearity of said valve comprising positive feedback means responsive to relative displacement of said valve, said manual means, and hydraulic servomotor and selectively additionally operating said servomechanism, whereby additional displacement is applied to said valve by said servomechanism to provide linear operation of said hydraulic servomotor in response to operation of said servomechanism by said means responsive to a flight condition of said craft and operation of said manual means.

References Cited in the file of this patent

UNITED STATES PATENTS 2,764,370    Yates _________________ Sept. 25, 1956